(12) United States Patent
Frankel et al.

(10) Patent No.: US 11,271,868 B2
(45) Date of Patent: Mar. 8, 2022

(54) PROGRAMMATICALLY CONFIGURED SWITCHES AND DISTRIBUTED BUFFERING ACROSS FABRIC INTERCONNECT

(71) Applicant: Ciena Corporation, Hanover, MD (US)

(72) Inventors: Michael Y. Frankel, Bethesda, MD (US); Vladimir Pelekhaty, Baltimore, MD (US); Daniel Rivaud, Ottawa (CA); Ian Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 27 days.

(21) Appl. No.: 16/940,621

(22) Filed: Jul. 28, 2020

(65) Prior Publication Data

US 2022/0038391 A1    Feb. 3, 2022

(51) Int. Cl.
*H04L 12/28* (2006.01)
*H04L 49/15* (2022.01)
*H04L 49/9047* (2022.01)

(52) U.S. Cl.
CPC .......... *H04L 49/15* (2013.01); *H04L 49/9047* (2013.01)

(58) Field of Classification Search
None
See application file for complete search history.

(56) References Cited

U.S. PATENT DOCUMENTS

| | | | | |
|---|---|---|---|---|
| 7,283,551 B1 * | 10/2007 | Algie | ..................... | H04J 3/1611 370/442 |
| 7,694,023 B1 * | 4/2010 | Hokenson | ......... | G06F 15/17375 709/249 |
| 8,054,840 B2 | 11/2011 | Booth et al. | | |
| 8,687,629 B1 * | 4/2014 | Kompella | ........... | H04L 49/1515 370/388 |
| 9,124,383 B1 | 9/2015 | Frankel et al. | | |
| 10,021,185 B1 * | 7/2018 | Kleinschnitz, Jr. | ........ | G06F 9/50 |
| 2005/0094630 A1 * | 5/2005 | Valdevit | .................. | H04L 49/25 370/360 |
| 2006/0036765 A1 * | 2/2006 | Weyman | ................. | H04L 49/15 709/245 |

(Continued)

OTHER PUBLICATIONS

Singla et al., "Jellyfish: Networking Data Centers Randomly," arXiv:1110.1687v3 [cs.NI] Apr. 20, 2012.

(Continued)

*Primary Examiner* — Elisabeth Benoit Magloire
(74) *Attorney, Agent, or Firm* — Clements Bernard Baratta; Lawrence A. Baratta, Jr.; Christopher L. Bernard (57) ABSTRACT

Programmable switches and routers are described herein for enabling their internal network fabric to be configured with a topology. In one implementation, a programmable switch is arranged in a network having a plurality of switches and an internal fabric. The programmable switch includes a plurality of programmable interfaces and a buffer memory component. Also, the programmable switch includes a processing component configured to establish each of the plurality of programmable interfaces to operate as one of a user-facing interface and a fabric-facing interface. Based on one or more programmable interfaces being established as one or more fabric-facing interfaces, the buffer memory component is configured to store packets received from a user-facing interface of an interconnected switch of the plurality of switches via one or more hops into the internal fabric.

20 Claims, 6 Drawing Sheets

(56) References Cited

U.S. PATENT DOCUMENTS

| | | | |
|---|---|---|---|
| 2008/0075071 | A1 | 3/2008 | Beshai |
| 2011/0064086 | A1 | 3/2011 | Xiong et al. |
| 2011/0243136 | A1 | 10/2011 | Raman et al. |
| 2013/0108259 | A1 | 5/2013 | Srinivas et al. |
| 2013/0108263 | A1 | 5/2013 | Srinivas et al. |
| 2013/0108264 | A1 | 5/2013 | Deruijter et al. |
| 2013/0117449 | A1 | 5/2013 | Hares et al. |
| 2013/0287397 | A1 | 10/2013 | Frankel et al. |
| 2013/0322443 | A1 | 12/2013 | Dunbar et al. |
| 2014/0153924 | A1 | 6/2014 | Deruijter |
| 2014/0198800 | A1* | 7/2014 | Krishnamoorthy ..... H04L 45/02 370/401 |
| 2014/0229944 | A1 | 8/2014 | Wang et al. |
| 2014/0270762 | A1 | 9/2014 | Li et al. |
| 2014/0307588 | A1* | 10/2014 | Kim ........................ H04L 49/15 370/256 |
| 2015/0076923 | A1 | 3/2015 | Frankel et al. |
| 2016/0191316 | A1* | 6/2016 | Guntaka ............... H04L 41/082 370/254 |
| 2017/0187629 | A1 | 6/2017 | Shalev et al. |
| 2019/0018815 | A1* | 1/2019 | Fleming ................ G06F 13/423 |
| 2021/0111951 | A1* | 4/2021 | Ali ..................... H04L 67/1097 |

OTHER PUBLICATIONS

Jyothi et al., "Measuring and Understanding Throughput of Network Topologies," arXiv:1402.2531v3 [cs.NI] Feb. 9, 2015.

Farrington et al., Helios: A Hybrid Electrical/Optical Switch Architecture for Modular Data Centers, SIGCOMM'10, Aug. 30-Sep. 3, 2010, New Delhi, India. Copyright 2010 ACM 978-1-4503-0201-2/10/08.

Broadcom, High-Density 25/100 Gigabit Ethernet StrataXGS® Tomahawk Ethernet Switch Series BCM56960 Series, accessed Oct. 21, 2015.

Koibuchi et al., "Layout-conscious Random Topologies for HPC Off-chip Interconnects," The 19th International Symposium on High-Performance Computer Architecture (HPCA), Feb. 2013.

Doyle, "Lessons from Altoona: What Facebook's newest data center can teach us," Network World (http://www.networkworld.com/) on Apr. 14, 2015.

Calient, "LightConnect™ Fabric Virtual Pod Data Centers," http://www.calient.net/solutions/lightconnectfabricvirtualpod-datacenters/, accessed Oct. 21, 2015.

* cited by examiner

PROGRAMMATICALLY CONFIGURED SWITCHES AND DISTRIBUTED BUFFERING ACROSS FABRIC INTERCONNECT

TECHNICAL FIELD

The present disclosure generally relates to networking systems and methods. More particularly, the present disclosure relates to programmable switches arranged in a data center for programming ports of the switches as the data center grows.

BACKGROUND

Figure 1:
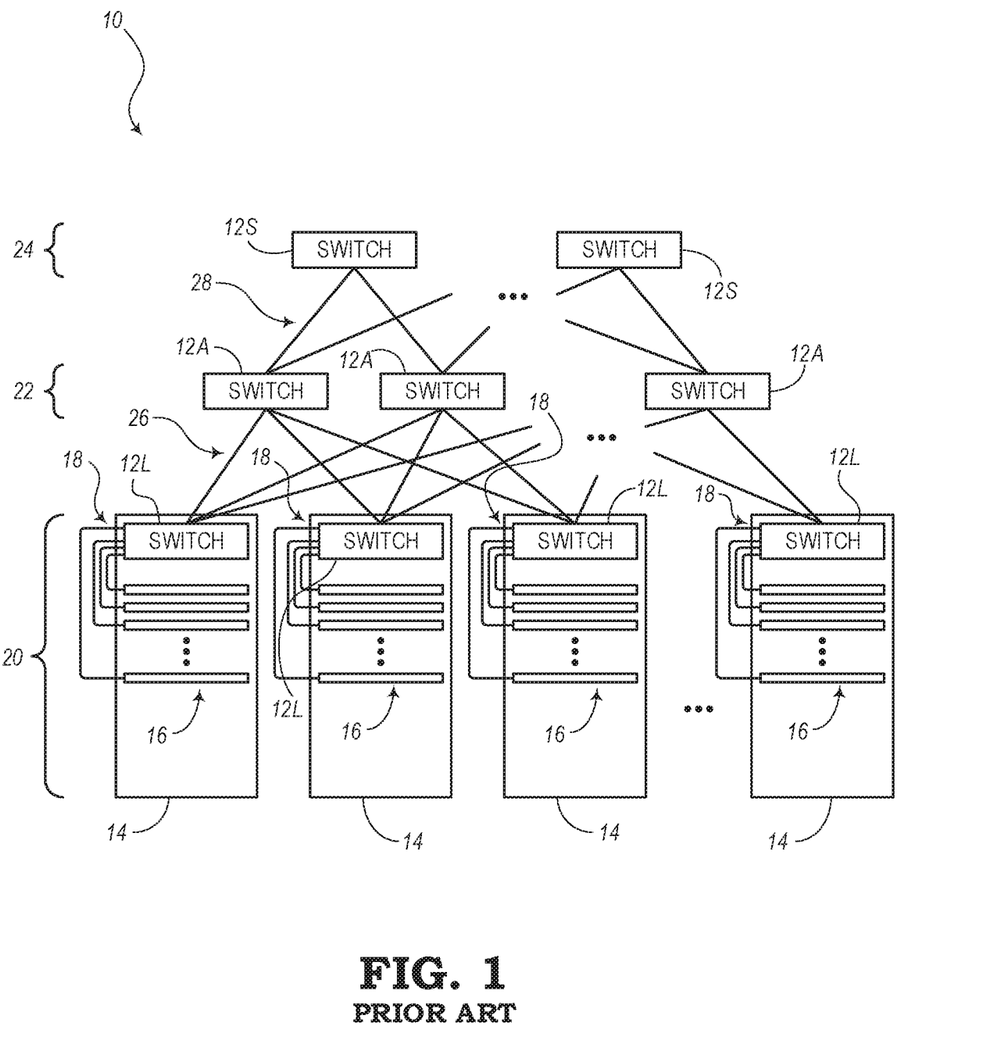
FIG. 1 is a diagram showing a data center arranged in a conventional Clos network configuration.

FIG. 1 is a diagram showing a data center 10 where switches 12L, 12A, 12S within the data center 10 are arranged in a conventional Clos network configuration. The data center 10 may include a plurality of racks 14, where each rack 14 may include a Top of Rack (TOR) leaf switch 12L and a plurality of servers 16. Each leaf switch 12L within the rack 14 may include a plurality of internal ports 18 for connection with the respective servers 16. In this arrangement, servers 16 within a single rack 14 may communicate with each other via the directly-connected leaf switch 12L. For instance, communication from one server to another within a single rack 14 may include a first hop from a first server to the leaf switch 12L and a second hop from the leaf switch 12L to a second server.

The Clos network in this data center 10 includes a first layer 20 (e.g., "leaf" layer) of leaf switches 12L that are arranged within the racks 14. Furthermore, the Clos network includes a second layer 22 (e.g., "aggregation" layer) of aggregation switches 12A and a third layer 24 (e.g., "spine" layer) of spine switches 12S. The Clos arrangement includes a first set of links 26 between the leaf switches 12L and the aggregation switches 12A and a second set of links 28 between the aggregation switches 12A and the spine switches 12S.

The portions of a telecommunications network that are typically incorporated within data centers, enterprise networks, Local Area Networks (LANs), High Performance Computing (HPC) environments, or other well-defined network environments are usually built with a highly-structured architecture. Some examples of highly-structured architectures that are frequently used within modern data center networks include Fat Tree, Clos, Dragonfly, Slim Fly, and B-Cube. These highly-structured network architectures are easy to visualize, can be built from smaller building blocks, provide high bisectional bandwidth, etc.

In addition to the overall network, the internal structure of traditional spine switches 12S and aggregation switches 12A is based on systems having a multi-stage Clos architecture. There are many examples of such systems in the industry. A typical configuration may be based on integrated circuits that include fully-featured Ethernet switches, which are deployed at a client-facing "edge" and provide packet processing (e.g., deep buffering, scheduling, shaping, prioritization, etc.) and framing packets into standard size cells. An example of the integrated circuits includes Jericho System-on-Chip (SoC) switch-router chips from Broadcom. A centralized fabric is composed of much simpler fabric element switches, which only support a very simple standard-size cell forwarding and minimal buffering.

The SoC switch-router chips also implement a Virtual Output Queues (VOQ) function, whereby a transmitter (TX) port indicates the amount of traffic that is buffered to a particular receiver (RX) destination port, and the RX maintains a record of such requests and issues TX credits to make sure that the RX port is not oversubscribed. Thus, the RX controls traffic injection into the system, while most buffering occurs at the TX side. The architecture is based on Clos configuration, such that a centralized switch fabric is deployed on day one of establishing a data center. Since each path is the same length, cells are forwarded via random paths (e.g., Equal-Cost Multi-Path (ECMP) routing) without controlling flow paths. Also, there may be a cell order reassembly at the RX ports.

The Clos-based configuration with VOQ buffering may be simple to operate, follows well-accepted industry standards, and may be efficient when fully filled. However, it also has a number of drawbacks. First, the centralized switch fabric of the Clos system must be deployed on day one, regardless of the number of client connections. Also, depending on the overall system port count, the system may include several layers of fabric element switches that are required, with a large fraction of ports (i.e., which increases the cost, size, and power being consumed) for internal scale-out interconnect.

Another drawback is that packets in the Clos system are buffered exclusively at the ingress to the large composite switch. Therefore, sufficient memory and memory bandwidth must be allocated to deal with local ingress packet congestion. Ingress memory must be sized such that each individual ingress location can fully deal with local congestion.

Clos type multi-layer fabrics need some redundancy and may have resilience limitations, depending on how many centralized elements are deployed and in what configuration. Lower cost configurations generally have reduced resilience to failures. Also, Clos configurations have lower throughput, higher latency, higher cost, and higher power compared to flat networks described with respect to the embodiments defined below. Also, longer Clos cables require more expensive Active Optical Cables (AOCs), instead of Direct Attach Cables (DACs). Existing products force a single physical mode for their fabrics: 100% on PCB traces or 100% on cables, not both.

Therefore, there is a need to provide a data center architecture that is able to overcome the drawbacks of the conventional systems. Also, data centers may benefit by having a way to gradually grow or scale to different network sizes based on current demand and the number of services being offered to customers.

BRIEF SUMMARY

The present disclosure describes various embodiments of programmable switches having programmable interfaces and data centers having a topology that is configurable based on how the interfaces are established in the programmable switches. For example, the interfaces may be programmed as user-facing interfaces or fabric-facing interfaces. In some embodiments, the topology of the data center or network may have a one-level or flat architecture that allows either a full-mesh or partial mesh configuration.

According to one implementation, a programmable switch is arranged in a network having a plurality of switches and an internal fabric. The programmable switch may include a plurality of programmable interfaces and a buffer memory component. The programmable switch also includes a processing component configured to establish each of the plurality of programmable interfaces to operate as one of a user-facing interface and a fabric-facing interface. Based on one or more programmable interfaces being established as one or more fabric-facing interfaces, the buffer memory component is configured to store packets received from a user-facing interface of an interconnected switch of the plurality of switches via one or more hops into the internal fabric.

According to another implementation, a system having a topology and an internal fabric may include distributed memory and a plurality of programmable switches interconnected with each other. Each of the programmable switches may include a plurality of programmable interfaces and a buffer memory component forming part of the distributed memory. Also, each programmable switch may include a processing component configured to establish each of the plurality of programmable interfaces to operate as one of a user-facing interface and a fabric-facing interface. Based on one or more programmable interfaces being established as one or more fabric-facing interfaces, the buffer memory component of the respective programmable switch may be configured to store packets received from a user-facing interface of another programmable switch via one or more hops into the internal fabric.

According to yet another implementation, a computer system operating in a data center having an internal fabric may include a processing device and a memory device configured to store a switch programming module. The switch programming module may have instructions that, when executed, enable the processing device to control a plurality of switches of the data center by establishing each of a plurality of programmable interfaces of the switches to operate as one of a user-facing interface and a fabric-facing interface. Based on one or more programmable interfaces being established as one or more fabric-facing interfaces, the processing device may cause a buffer memory component of a respective switch to store packets received from a user-facing interface of another switch in the data center via one or more hops into the internal fabric.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to data centers or other sections of a communications network having distributed memory (e.g., buffer memory components) throughout the data center. For example, in some embodiments, each switch device in the data center may be configured with buffer memory for creating a distributed system of memory components. The concept of distributing memory may be implemented in a data center having any type of network arrangement, such as a multi-level architecture (e.g., Clos) or a one-level (or "flat") architecture. According to some of the preferred embodiments of the present disclosure, the distributed memory is applied to a flat network.

More particularly, the data centers of the present disclosure include programmable switches, whereby the switches may be programmed such that the ports of each switch can be configured as a "user-facing" interface or a "fabric-facing" interface. User-facing interfaces/ports may also be referred to as User-Network Interfaces (UNIs). Also, fabric-facing interfaces/ports and internal ports may also be referred to as Network-Network Interface (NNIs). The fabric-facing interfaces of the various switches can be interconnected to form a mesh-like network, which may be arranged in a one-level or "flat" configuration. The present disclosure also relates to systems and methods for programming the switches of the data center in a manner that allows for continued growth of the data center to provide a greater level of operation at each stage of growth with respect to latency, efficiency, power consumption, etc.

The implementations of the present disclosure may be based on a flat network architecture and may further include features that provide certain advantages over other flat networks like Slim Fly, Dragonfly, B-Cube, etc. It should be noted that the topological network-side (or fabric-facing) connections, although described in the present disclosure as single links, may also include multiple parallel physical links as needed to support a required bandwidth.

Testing has been performed to analyze various characteristics of the conventional systems versus new configurations described according to the embodiments of the present disclosure. Packet-level simulations were performed on both the conventional Clos-type networks, as well as flat-mesh configurations as described herein. The simulations were extended to capture packet latency. Although simulations were performed without direct measurements on the commercial devices, the results of the simulations were cross-checked against published results with respect to throughput. The published results matched the packet simulations quite well, giving confidence in the overall analysis.

It was observed from this testing that there was a reasonable match between the published results and the Clos packet modeling data. A flat network, according to the embodiments described with respect to the present disclosure, provided a much better throughput. In the simulations, the Queue was short (e.g., 8). Compared to the conventional system, the present systems (including a flat network architecture) were able to handle "adversarial" traffic patterns. The flat network of the present disclosure was able to deliver much higher throughput and much lower latency compared to a conventional Clos configuration.

Regarding latency, the Clos arrangement showed expected behavior, whereby longer queues lowered the drops. However, this also substantially increased the latency compared to the embodiments of the systems of the present disclosure. The flat network of the present disclosure showed much lower maximum and average latency while simultaneously having a lower drop rate.

Also, the component counts for the two systems were compared. The chassis switches implemented in the Clos network versus the flat network showed substantial advantages accruing to the flat networks. In a realistic comparison between the implementations for Clos and flat networks, a Clos baseline included a client interface card of 30 client ports and 40 fabric ports (with protection redundancy), a fabric card of 32 fabric ports, with the overall configuration providing 480 total client ports (i.e., 16 client interface cards times 30). This configuration has 480 internal fabric links. In a flat network, no fabric cards are needed, and the number of fabric links may be reduced to 380 fabric links (with intrinsic resilience). Thus, a flat network provides substantial reduction in fabric card and fabric link counts. Also, the flat network can have a smaller size, lower cost, and smaller power consumption while also preserving the other advantages.

Also, client use connections (i.e., user-facing interfaces) may be provided at each switch element as needed. The bandwidth ratio between Network-to-Network Interfaces (NNIs) (via fabric-facing interfaces) and User-to-Network Interfaces (UNIs) (via user-facing interfaces) may be used to determine an oversubscription ratio. In general, the number of NNI ports is greater than the number of UNI ports to allow the NNI links to support both local aggregation as well as express traffic bandwidth. Although the present disclosure describes "switches," these components may also include routers, nodes, cards, Application-Specific Integrated Circuits (ASICs), programmable protocol independent devices (e.g., Protocol-Independent Switch Architecture (PISA™) type switches or other protocol agnostic devices), etc.

Large-scale multi-terabit routers (and switches) may be needed to sustain the continued growth of communication networks. Such routers may be used extensively across all networking markets, including spine switches inside data centers, peering routers in network cross-connects, packet edge routers in access and metro networks, and as core routers in long haul networks. A commercial example may include the router chassis with line cards, which may be used both inside data centers and in Wide Area Networks (WANs).

Generally, it is desirable that a switch (or router) is configured such that it can provide one or more of the following features or results:

a) Low latency and full (i.e., 100%) throughput, even at full packet load from client interfaces, b) Support for industry standard protocols at client interfaces, c) Scalable to 100s of terabits, d) Graceful scaling curve with low day-one cost and pay as you grow trajectory, e) Include diverse supply chain of commercial ASIC or FPGA as building blocks, f) Avoid expensive custom development of any hardware components (e.g., electrical or optical components), Although conventional switches may be able to meet or include some of these features, none are configured to meet all of them. However, the embodiments of programmable switches and gradual-growth architecture described in the present disclosure are configured to satisfy most or all of these features.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Distributed Buffer Memory

Figure 2:
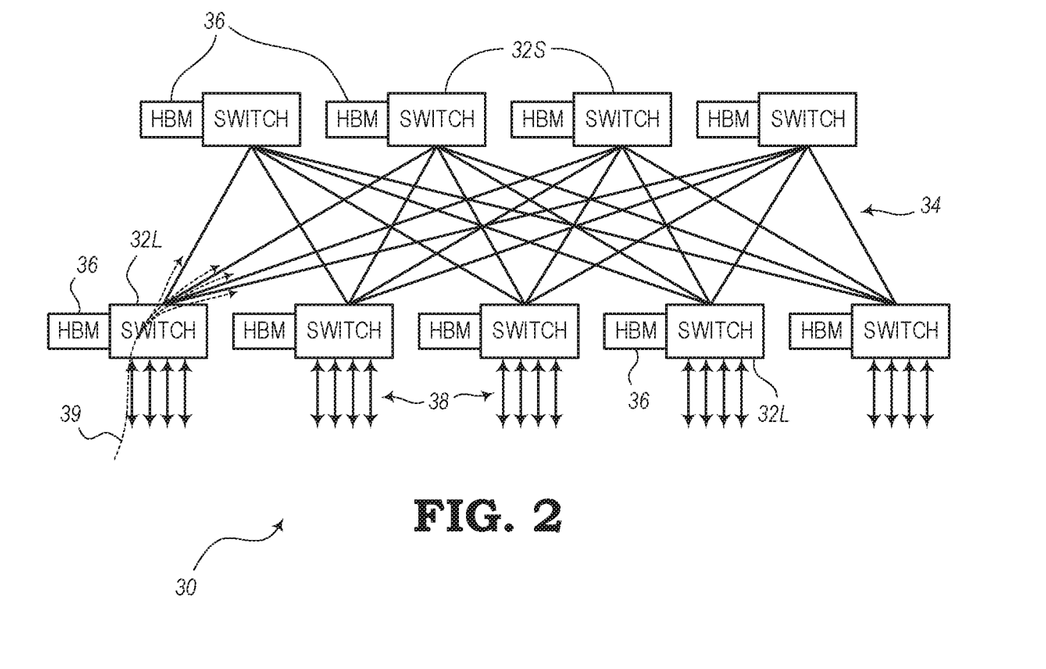
FIG. 2 is a diagram showing a data center with distributed memory arranged in a two-level Clos network configuration, according to various embodiments of the present disclosure.

FIG. 2 is a diagram showing an embodiment of a data center 30 (or other section of a network) arranged in a two-level Clos network configuration. In this embodiment, the data center 30 include a plurality of switches 32L, 32S arranged in two levels, where switches 32L shown on the lower level may be configured as leaf switches and the switches 32S shown on the higher level may be configured as spine switches. Each of the switches 32L on the lower level are connected to the switches 32S on the higher level via links 34. Also, each switch 32L, 32S is connected to a respective High Bandwidth Memory (HBM) unit 36 (or other suitable types of buffer memory components). The HBM units 36 may include high capacity (e.g., multi-Gigabyte) memory modules or buffer memory components, which may be relatively expensive and typically require a large amount of power. Similarly, interfaces (not shown) between the switches 32L, 32S and their respective HBM units 36 are also relatively expensive and power hungry.

Conventional switches (or routers) may use a Virtual Output Queue (VOQ) construct, whereby overflow packets are detected at an egress port of the switch, while actual buffering occurs on an ingress port of the switch. With VOQ, packets may be physically buffered in ingress port, but buffering decision may be controlled by a remote egress output port. This construction prevents overloading both the egress port and of internal fabric of the switch. However, packet buffering is localized, and large memory buffers have to be provided at each ingress module, sufficient to handle local worst-case buffering conditions. However, according to the embodiments of the present disclosure, the HBM units 36 are provided both at ingress modules and at modules that may be one-hop into the fabric. By combining HBM units 36 with each of the switches 32, as shown in FIG. 2, this arrangement may be applied to the two-level Clos architecture of the data center 30. Also, this arrangement (i.e., combination of switches 32 and HBM units 36) can be applied to any switch interconnect topology (e.g., Clos, Compound Graph, Expander, etc.).

The switches 32L of the two-level folded Clos architecture of FIG. 2 include user-facing interfaces 38 or ports, whereas the switches 32S are used merely for interconnection purposes. Incoming flow packets 39 are received at the user-facing interfaces 38 and are distributed or spread across multiple (or all) intermediate nodes (i.e., higher level switches 32S). The packets 39 may be distributed in a predetermined pattern, a pseudo-random pattern, an algorithmically determined pattern, a uniform pattern, or any other suitable types of strategic patterns for effective load distribution. In this way, the distribution of packets 39 can provide a balance to or improve the balancing of the internal network load to maximize or optimize the distribution, regardless of specific source-destination traffic pattern. Thus, instead of memory only at an ingress level (including switches 32L), buffer memory components may also be distributed to switches 32S one hop (or more) from the ingress level.

Since packets may be pseudo-randomly spread across the internal fabric of the data center 30, any packet congestion that needs to be buffered can use the full distributed memory that is made up of the multiple HBM units 36 (or other suitable types of buffer memory components). Therefore, packet buffering can strongly benefit from statistical multiplexing. Also, because of statistical multiplexing, the size of individual HBM units 36 can be reduced proportionally, which, in some cases, may be reduced by a factor of about two or more. Another benefit is that the bandwidth of interfaces between switches 32 and the HBM units 36 can also be reduced by a similar factor.

In some cases, packets may arrive at the egress ports out of order. In order to recover the correct sequence of packets, the egress ports may be programmed to enable packet order recovery. For example, one example of packet order recovery is described in U.S. patent application Ser. No. 16/565,541, filed Sep. 10, 2019, entitled "Packet order recovery in a programmable edge switch in a data center network," the entire contents of which are incorporated by reference in the present disclosure.

Figure 3:
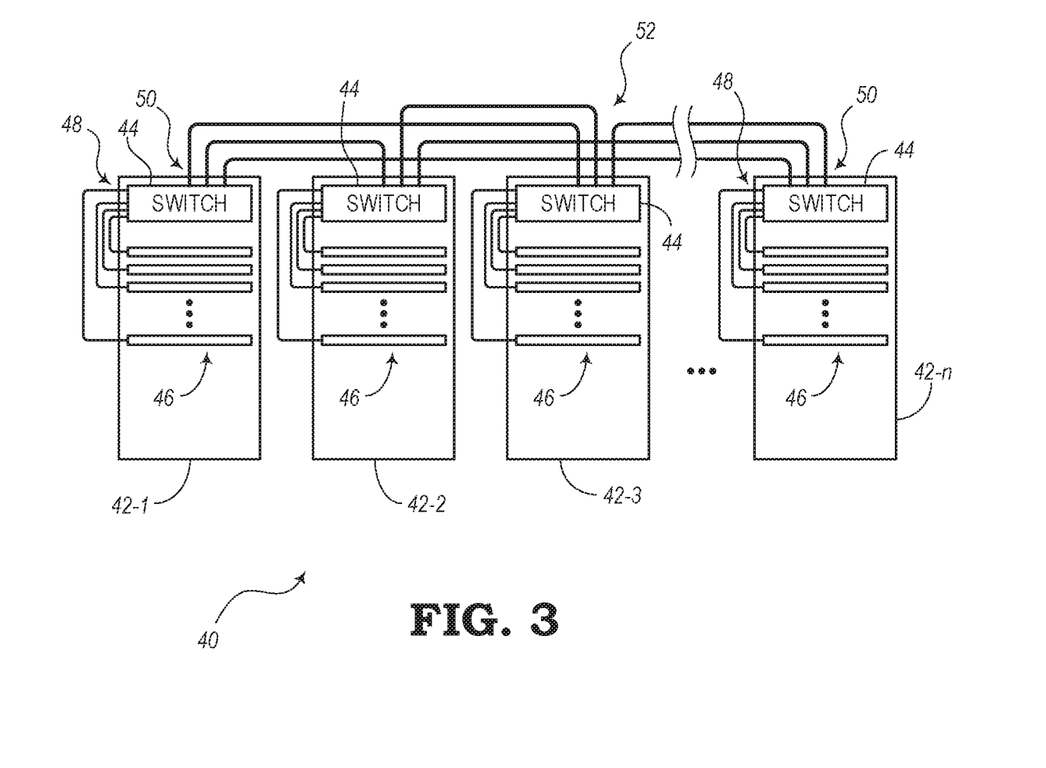
FIG. 3 is a schematic diagram illustrating a data center arranged in a one-level (or flat) configuration, according to various embodiments of the present disclosure.

FIG. 3 is a schematic diagram illustrating an embodiment of a data center 40 (or high-performance computing application, enterprise, LAN, or other network environments). In this embodiment, the data center 40 is arranged in a one-level (or "flat") configuration. The configuration includes a flat arrangement of interconnecting switches in the data center 40. The data center 40 in this example includes a number of racks 42-1, 42-2, 42-3, . . . , 42-n. Each rack 42 includes a switch 44, such as a TOR switch. Each switch 44 includes a number of internal ports 48 (e.g., UNI inward directed ports) dedicated for connection with a plurality of servers 46 (e.g., blade servers) within the respective rack 42. Each switch 44 also includes a number of external ports 50 (e.g., NNI outward directed ports) for direct connection with at least one other switch 44 within other racks 42. The direct interconnection of switches 44 may be made through electrical and/or optical transmission links 52 or interfaces. Each switch 44 may include two or more links 52 for connection with any two or more of the other switches 44 in the data center 40. According to the example shown in FIG. 3, each switch 44 includes three outward-directed ports 50, whereby three links 52 provide connection with three different switches 44. Also, as described below, the links 52 may include interconnections that form a loosely-structure or pseudo-random arrangement.

Further, the data center 40 may operate with an efficient routing protocol for loosely structured or unstructured networks such as the structured, rearranged network architecture. The routing protocol may include a protocol as described in U.S. patent application Ser. No. 16/656,783, filed Oct. 18, 2019, entitled "Routing tables for forwarding packets between switches in a data center network," the entire contents of which are incorporated by reference in the present disclosure.

Figure 4:
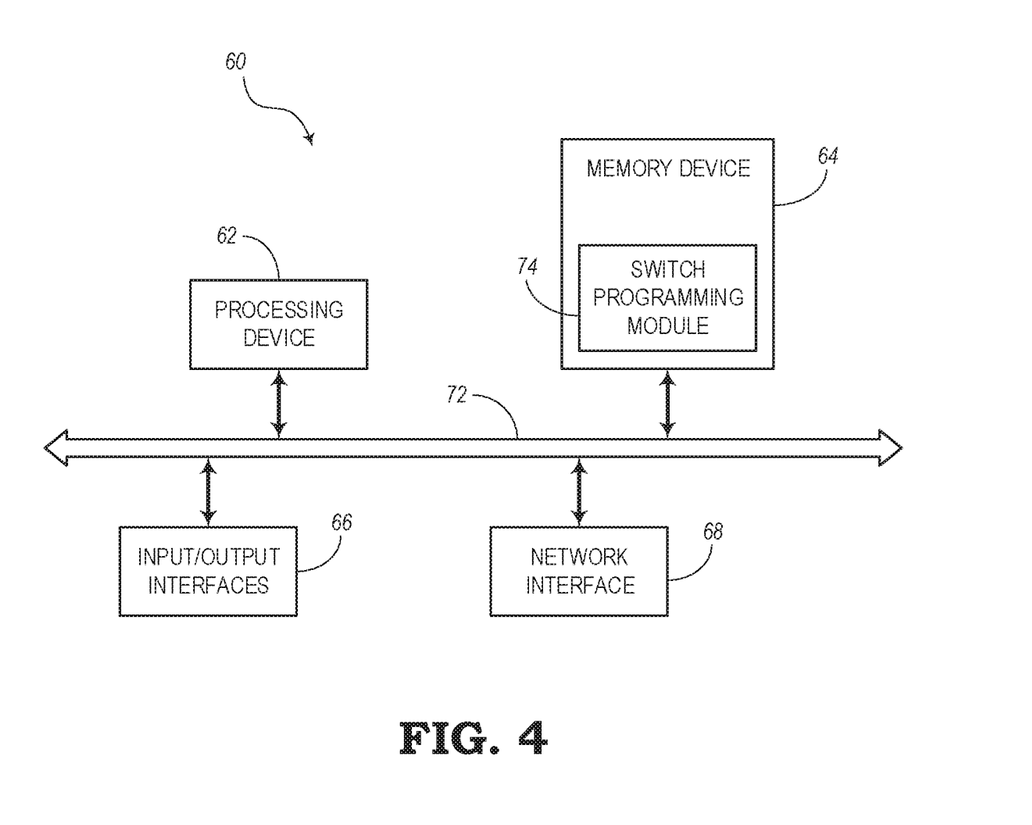
FIG. 4 is a block diagram illustrating a computing system for programming a number of switches in a data center, according to various embodiments of the present disclosure.

FIG. 4 is a block diagram illustrating a computing system 60 for programming a number of switches in a data center (e.g., data center 30, 40) of a communications network. In the illustrated embodiment, the computing system 60 may be a digital computer that, in terms of hardware architecture, generally includes a processing device 62, a memory device 64, Input/Output (I/O) interfaces 66, and a network interface 68. The memory device 64 may include a data store, database, or the like. It should be appreciated by those of ordinary skill in the art that FIG. 4 depicts the computing system 60 in a simplified manner, where practical embodiments may include additional components and suitably configured processing logic to support known or conventional operating features that are not described in detail herein. The components (i.e., 62, 64, 66, 68) are communicatively coupled via a local interface 72. The local interface 72 may be, for example, but not limited to, one or more buses or other wired or wireless connections. The local interface 72 may have additional elements, which are omitted for simplicity, such as controllers, buffers, caches, drivers, repeaters, receivers, among other elements, to enable communications. Further, the local interface 72 may include address, control, and/or data connections to enable appropriate communications among the components 62, 64, 66, 68.

According to one embodiment, the computing system 60 may be configured to enable a data center (e.g., data center 30, 40) to grow (or scale) over time depending on the current need. For example, when a data center is first established, there may be fewer switches in use. However, as the data center grows, the data center at this later development stage can be updated to keep up with increased demand. In particular, a switch programming module 74 may be stored in the memory device 64 for programming the switches of the data center at times when new switches and servers are added. In some embodiments, the functions described with respect to the switch programming module 74 may be implemented in any combination of hardware, software, and/or firmware in the processing device 62 and/or memory device 64.

The processing device 62 is a hardware device adapted for at least executing software instructions. The processing device 62 may be any custom made or commercially available processor, a Central Processing Unit (CPU), an auxiliary processor among several processors associated with the computing system 60, a semiconductor-based microprocessor (in the form of a microchip or chip set), or generally any device for executing software instructions. When the computing system 60 is in operation, the processing device 62 may be configured to execute software stored within the memory device 64, to communicate data to and from the memory device 64, and to generally control operations of the computing system 60 pursuant to the software instructions.

It will be appreciated that some embodiments of the processing device 62 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 62 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 66 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 66 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 68 may be used to enable the computing system 60 to communicate over a network or data center, such as the data center 30, 40, the Internet, a Wide Area Network (WAN), a Local Area Network (LAN), and the like. The network interface 68 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 68 may include address, control, and/or data connections to enable appropriate communications on the data center 30, 40.

The memory device 64 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 64 may incorporate electronic, magnetic, optical, and/or other types of storage media. The memory device 64 may have a distributed architecture, where various components are situated remotely from one another, but can be accessed by the processing device 62. The software in memory device 64 may include one or more software programs, each of which may include an ordered listing of executable instructions for implementing logical functions. The software in the memory device 64 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 64 may include a data store used to store data. In one example, the data store may be located internal to the computing system 60 and may include, for example, an internal hard drive connected to the local interface 72 in the computing system 60. Additionally, in another embodiment, the data store may be located external to the computing system 60 and may include, for example, an external hard drive connected to the Input/Output (I/O) interfaces 66 (e.g., SCSI or USB connection). In a further embodiment, the data store may be connected to the computing system 60 through a network and may include, for example, a network attached file server.

Moreover, some embodiments may include a non-transitory computer-readable storage medium having computer readable code stored in the memory device 64 for programming the computing system 60 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 62 that, in response to such execution, cause the processing device 62 to perform a set of operations, steps, methods, processes, algorithms, functions, techniques, etc. as described herein for the various embodiments.

Flat Internal Fabric Network with Programmable Switch ASICs

Figure 5:
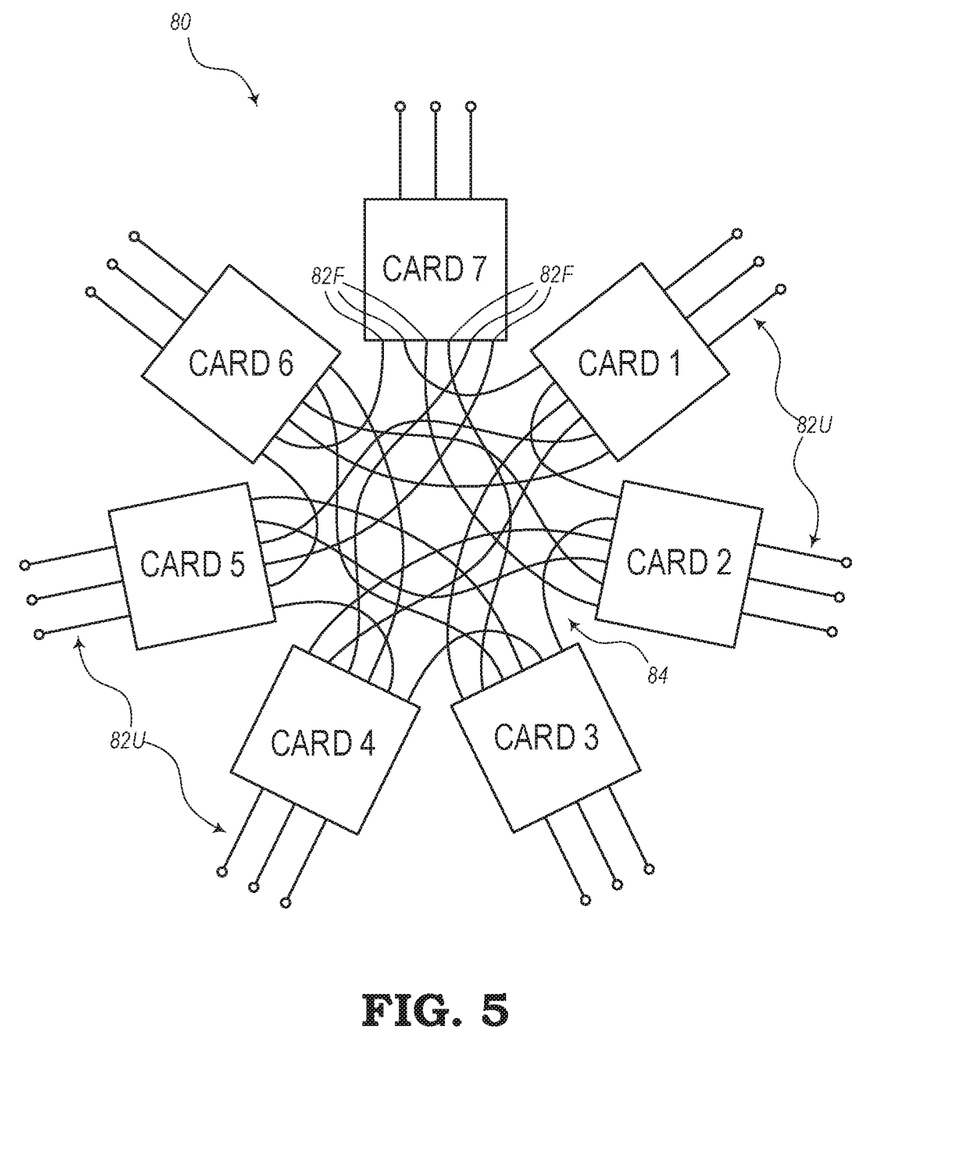
FIG. 5 is a diagram illustrating a plurality of switch cards configured for a flat configuration with full-mesh interconnect, according to various embodiments of the present disclosure.

FIG. 5 is a block diagram illustrating an embodiment of a data center 80 (or another portion of a communication network) having an arrangement of switch cards (labelled "card 1," "card 2," etc.). In this embodiment, the data center 80 includes seven cards configured with full-mesh interconnection. The cards may include any suitable type of processing component and in some cases may be referred to as switch ASICS, ASIC components, etc. Although seven slots or cards are shown, it should be noted that any number of slots/cards may be included in the data center 80.

Each card (i.e., "card 1," "card 2," etc.) may include a respective switch (e.g., switch 32) and buffer memory component (e.g., HBM unit 36), such as is shown in FIG. 2. However, a difference between the two-level data center 30 of FIG. 2 and the flat (i.e., one-level) data center 80 of FIG. 5 is that each card 1-7 (e.g., processing component, switch ASIC, ASIC component, etc.) shown in FIG. 5 includes a number of user-facing ports 82U, whereas only the lower level switches 32L shown in FIG. 2 include user-facing interfaces 38. Also, the cards 1-7 are configured with fabric-facing ports 82F. It should be noted, however, that the cards 1-7 may be programmed such that each of their respective ports 82U, 82F may be configured as a user-facing port or a fabric-facing port depending on how the cards are programmed at that time. A plurality of links 84 shown in FIG. 5 are configured to interconnect the fabric-facing ports 82F of the cards 1-7 together. In this embodiment, the card 1-7 are each programmed to include six fabric-facing ports 82F, such that the links 84 can connect all the card together in a full-mesh configuration. This arrangement contrasts with the embodiment of FIG. 2 whereby the lower level switches 32L are only connected to upper level switches 32S and upper level switches 32S are only connected to lower level switches 32L.

While the "distributed memory" concept (e.g., buffer memory components) described with respect to FIG. 2 can be applied regardless of network topology, there are additional substantial benefits that can be derived by having distributed memory in a flat (i.e., one-level) network topology as shown in FIG. 5. For example, flat networks are configured such that all the switch ASICs (e.g., cards 1-7) provide client port (i.e., user-facing port 82U) connections. As such, none of the switch ASICs are configured as centralized fabric element switches that serve a purely network interconnection (or spine) function. Each switch ASIC (i.e., card) in the data center 80 (having a flat configuration) has a number of ports 82F that face towards other switches (cards) in the network. The interconnections between switches (via links 84) is established in a particular way, which determines the overall internal topology.

It may not be intuitively obvious, but such networks are known to be much more efficient in operating with less hardware, providing higher throughput, and achieving lower latency than multi-layer structured networks (e.g., Clos), as described, for example, by Godfrey, "*Measuring and Understanding Throughput of Network Topologies*," S. A. Jyothi, et al, http://arxiv.org/abs/1402.2531v3, Godfrey, "*Jellyfish: Networking Data Centers Randomly*," A. Singla, et al., https://arxiv.org/abs/1110.1687, and Casanova, "*Layout-conscious Random Topologies for HPC Off-chip Interconnects*," Henry Casanova et al., 2013 IEEE 19th International Symposium on High Performance Computer Architecture (HPCA2013).

Some of the advantages of single-layer, unstructured architectures are enumerated below:

a) Use only commercial off-the-shelf components (e.g., switch ASICs, pluggable optical modules, optical pluggables, etc.), b) De-layers the network, c) Higher throughput and fewer hops (e.g., four or fewer) with high diverse path, d) Reduced hardware for a fixed throughput, e.g., fewer optical links and switches, e) Smooth, continuous trade-off of hardware cost and throughput (no large discrete increments), f) Easily scalable, e.g., new server and switch insertion is simple, even with different port counts and technologies, g) Pay only for servers used, e.g., allow simpler day-one configuration with no underutilized centralized fabric, h) Ports can be aggregated into a few large bundles, improving optical transceiver cost and front-panel density (e.g., typically 16 distinct port bundles may be sufficient, whereby, in contrast, Clos scalability requires very large port fan-out to realize large network E-W scalability), i) Substantially increase resilience to failure through richer interconnect and through workload spread across the full data center, and j) Fully packetized.

The data center 80 of FIG. 5 has a flat topology, but, more importantly, it includes cards (e.g., cards 1-7) that implement a new class of switch ASICs that offer programmable interfaces. The programmable switch ASICs are used to allow the flat network in which they are configured to provide a flexible topology. In this way, the data center 80 includes a variable topology that provides an ability to programmatically adjust oversubscription ratios, number of hops, latency, throughput, etc. This may be accomplished, as described in the present disclosure, by programmatically assigning physical interfaces to one of two functions:

1) Client interfaces (e.g., UNIs) offering rich support for standards compliant protocols, consuming more internal resources and power, and 2) Internal fabric interfaces (e.g., NNIs) with minimal functionality for packet forwarding from client ingress to egress interfaces, consuming minimal internal resources and power.

The processing components or switch ASICs of the cards 1-7 shown in FIG. 5 have a fixed number of physical ports (i.e., user-facing ports 82U plus fabric-facing ports 82F) that can be programmed as client-facing or internal-facing ports. The switch programming module 74 shown in FIG. 4 may be configured to establish programmable port assignment, based on the size or anticipated growth of the data center 80 at a future development stage. By assigning the ports, the switch programming module 74 is configured to implement variable topologies.

For example, FIG. 5 shows an exemplary configuration with seven switch cards 1-7, each card having three user-facing ports 82U and six fabric-facing ports 82F. The internal fabric-facing ports 82F may be connected to links 84 to create the full-mesh interconnection configuration as shown or may be programmed in other ways as needed at that particular stage in development of the data center 80. Thus, the arrangement shown in FIG. 5 illustrates how multiple cards, each card having nine total physical ports, can be programmed such that ports can be assigned for different functions.

Further, such programmable port flexibility allows the same hardware to function in Expander mode and in Clos mode. In some configurations, the data center 80 may be configured with a mix of Clos and Expander cabling within one system as needed to achieve customer goals, to achieve an accurate timing distribution, etc. Basically, the ports 82U, 82F may be referred to as dual-mode ports that can interface with client devices or with the internal fabric of the data center 80.

Pass-Through Topology Expansion Cards

FIGS. 6A-6F are diagrams illustrating stages of a data center (e.g., data center 80) during a gradual growth process utilizing programmable switches. In each stage of this example, there are seven "slots." Each slot may receive a card (e.g., cards 1-7 as shown in FIG. 5) or a "short" card (e.g., short A, short B, short C) having one or more shorted paths (e.g., internal short paths). In some cases, one or more slots may be left empty. The short cards may have one or more direct connections or paths, where each connection/path is configured to directly connect any pair of ports of the particular card.

Figure 6A:
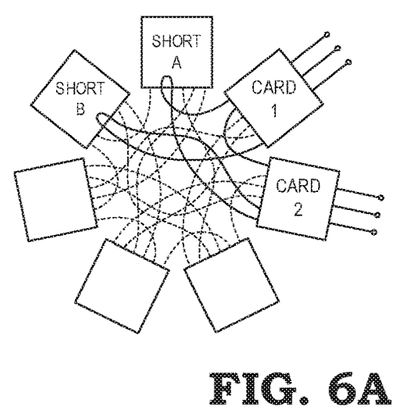
FIG. 6A-FIG. 6F are diagrams illustrating stages of a data center during a gradual growth process utilizing programmable switches, according to various embodiments of the present disclosure.

FIG. 6A represents an early stage in which only two cards (i.e., card 1 and card 2) are connected in two slots. In this case, two short cards (i.e., short A and short B) are also connected in two slots. The ports of shorts A, B are each internally configured such that a connection to card 1 is shorted to a connection to card 2. As a result, there are essentially three paths (e.g., parallel paths) between cards 1 and 2. It is also possible to utilize three additional short cards in three remaining empty slots to double the number of parallel paths between cards 1 and 2, but the short cards might have to be removed and replaced by fully functional cards in the process of further network growth. It should be noted that the shorts do not include any client ports or user-facing ports 82U.

Figure 6B:
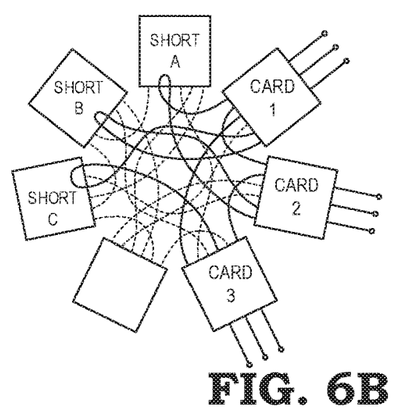

When growth in the data center is needed, cards and shorts may be added. For example, in FIG. 6B, card 3 is added to a slot and short C is added to another slot. Still, one slot at this stage is left empty, and it can be used to supplement the parallel paths between the fully functional cards as needed. As mentioned above, shorts A and B are already configured to provide parallel connections between cards 1 and 2. In FIG. 6B, the new short C may be configured, as shown in this example, to short two of its ports (e.g., via an internal short path), which, in this embodiment, is configured to provide a direct connection (or parallel path) between card 1 and new card 3.

Figure 6C:
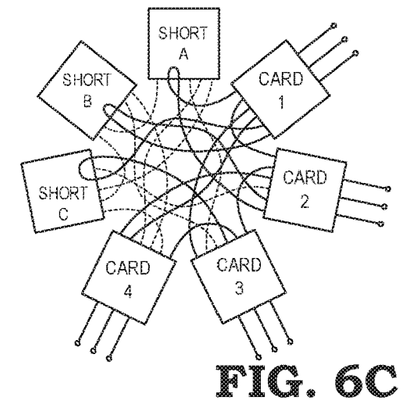
Figure 6D:
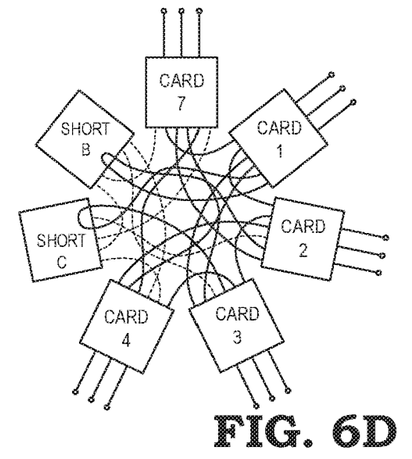
Figure 6E:
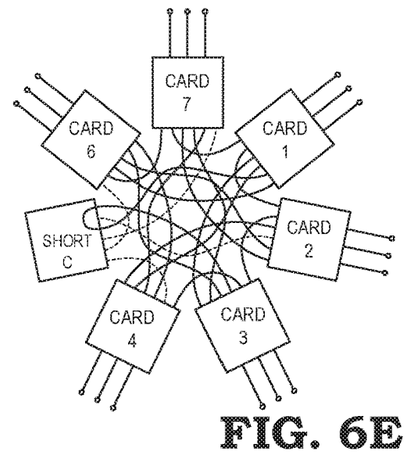
Figure 6F:
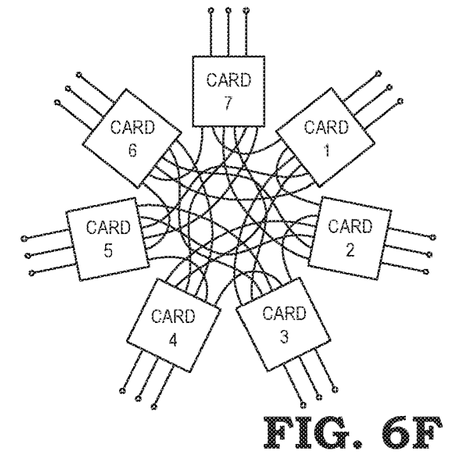

FIGS. 6C-6E show three more stages of growth where cards are inserted into empty slots or are inserted to replace the shorts, to thereby provide additional services for the client when the data center so demands. FIG. 6F shows the last short being replaced with a card (i.e., card 5) to provide a filled topology (similar to FIG. 5).

In conventional systems, Clos and other multi-layer architectures rely on pre-deployed upper layer switches to support overall expansion. Therefore, even when an initial configuration may demand only a single client module, full centralized switch fabric needs to be pre-deployed in anticipation of future expansion. This approach is expensive, power hungry, and generally not inherent to flat topologies since it has no central fabric.

At the same time, flat topologies rely on client modules to provide the two functions of 1) handling client connectivity and 2) handling internal fabric forwarding of packets in cases where direct interconnect path is either not provisioned or congested. When the topology is deployed in underfilled configuration with only a few client modules, the diversity and bandwidth of internal fabric interconnect is compromised.

Thus, conventional systems are typically not programmable in such a way that enables the data center to be grown (or scaled) gradually. The gradual growth issue is addressed in the present disclosure by a judicious addition of short (pass-through) cards that provide internal fabric bandwidth and connectivity expansion in place of future upgrades. Before a fully developed data center (with a full-mesh topology) is needed (e.g., FIG. 6F), the short cards A, B (shown in FIGS. 6A-6C) are set up to include pass-through connections with limited connectivity. Solid lines are shown in the drawings to indicate provisioned connections, while dashed lines in the drawings indicate future connections that have yet to be deployed.

It should be noted that the shorts A, B, C may only have a sub-set of connections, simplifying their configuration. Once a short A, B, C is deployed, its configuration is fixed until it is removed and replaced by a full-featured client card (i.e., one or more of cards 1-7). Further, only a subset of empty slots may be filled with shorts. Alternatively, all of the empty slots may be filled with shorts to provide full potential parallel paths. Depending on the type of physical connection, shorts may be fully passive with zero power such as when using a fiber patch-cord for an optical link or may require some electrical amplification and conditioning as when connections are electrical links.

Cabling Flexibility Benefits

For systems that fit within 1-3 racks, there may be cabling flexibility benefits. Whereas a Clos network typically has many long cables going to a central fabric, a flat network has a high percentage of short cables that go between adjacent boxes (cards 1-7), which may sometimes be positioned only a few Rack Units (RUs) apart. This means that a substantial cost saving can be achieved for a large percentage of the flat interconnect because inexpensive Direct Attach Copper (DAC) cables can replace expensive Active Electrical Cables (AECs) or Active Optical Cables (AOCs).

Not only can the data center 80 be arranged by substituting AECs/AOCs with less expensive DACs, but also the data center 80 can be arranged by substituting the shortest cables with PCB traces across a backplane. The resulting system offers a fabric that combines the use of many physical media (e.g., PCB traces, DACs, AECs, AOCs, passive optical cables, silicon photonics, etc.). Another functional attribute is that the edge ASICs may be configured with a programmable egress port pipeline to enable packet order recovery.

Figure 7:
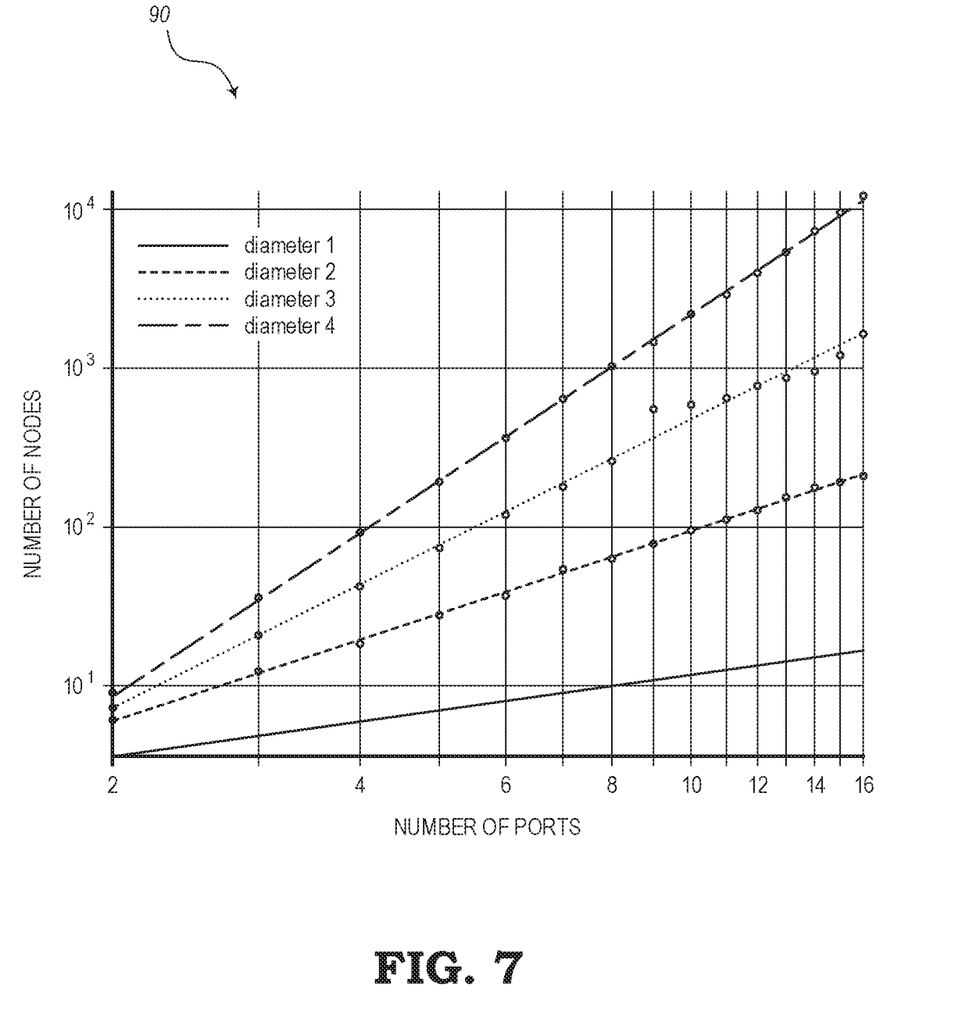
FIG. 7 is a graph of numbers of nodes versus numbers of NM ports showing possible interconnected switches having different diameters, according to one example.

FIG. 7 is a graph 90 showing a number of nodes on one axis and a number of NNI ports on another axis. Both axes have a logarithmic scale to form the log-log graph 90. The graph 90 shows possible interconnected switches having different diameters. Flat network architectures can vary from fully connected network of n nodes with as many as n−1 ports (similar to a complete graph Kn of degree d=n−1, having diameter k=1), to connected ring of n nodes with just two ports each and having diameter k equal to half of the number of nodes (equivalent to the cycle graph Cn). Within these two extremes, number of nodes (i.e., switches) n varies with degree d and diameter k approximately as follows, with this empirical dependence illustrated in FIG. 7. As shown, networks can be accommodated with very large numbers of switches having only 3 or 4 packet hops, and small port counts. Most likely, a configuration according to some embodiment may implement a full-mesh interconnect. However, other possibilities may be contemplated, including embodiments having a more traditional Clos structure, as well as Slim Fly, Dragonfly, etc. The various configurations can be specifically selected by a customer as desired.

Therefore, the present disclosure provides programmable switches with programmable interfaces for use in a data center or other section of a network. A programmable switch, which may be arranged in a network having a plurality of other switches, may include a plurality of programmable interfaces and a processing component (e.g., ASIC) configured to establish each of the plurality of programmable interfaces to operate as one of a user-facing interface and a fabric-facing interface. For example, in one embodiment, a programmable switch may be arranged in a network having a plurality of switches and an internal fabric. Again, the programmable switch may include a plurality of programmable interfaces, a buffer memory component (e.g., HBM unit), and a processing component (e.g., ASIC, FPGA, etc.). The processing component may be configured to establish each of the plurality of programmable interfaces to operate as one of a user-facing interface and a fabric-facing interface. Based on one or more programmable interfaces being established as one or more fabric-facing interfaces, the buffer memory device may be configured to store packets received from a user-facing interface of an interconnected switch of the plurality of switches via one or more hops into the internal fabric.

The network may be arranged with a flat internal fabric and full-mesh configuration. The flat internal fabric may include one or more of Direct Attach Cables (DACs), Active Electrical Cables (AECs), Active Optical Cables (AOCs), passive optical cables, silicon photonics, and Printed Circuit Board (PCB) traces. Based on one or more programmable interfaces being established as one or more user-facing interfaces, the processing component may further be configured to spread packets received at the one or more user-facing interfaces in a predetermined pattern, a pseudo-random pattern, an algorithmically determined pattern, a uniform pattern, or any other suitable types of strategic patterns for effective load distribution. In this way, the packets can be distributed to provide a balance to or improve the balancing of the internal network load to maximize or optimize the distribution, regardless of specific source-destination traffic pattern.

The processing component may be independent of any particular protocol or may be referred to as protocol agnostic. The processing component may be configured to adjust an oversubscription ratio. The programmable switch may also include a buffer memory component, which may further include a Virtual Output Queue (VOQ) construct and/or may be a High Bandwidth Memory (HBM) device (e.g., HBM unit).

The plurality of programmable interfaces may be dual-mode ports, whereby the processing component (e.g., ASIC) may be configured to establish each of the programmable interfaces to operate in either a user-port mode (UNI) or a network-port mode (NNI). The processing component may establish the programmable interfaces to operate in either of the user-port mode or the network-port mode based on a development stage of the network.

Therefore, according to the various embodiments of the present disclosure, systems are provided which include a distributed memory as described with respect to FIG. 2. Packets may take one hop inside the network before being buffered in VOQ memory. VOQ memory is allocated from a pool distributed among the intra-chassis routers, in contrast to traditional VOQ buffering at UNI packet entry ports only. Packets are sent to one-hop neighbor ports with least-occupied memory via NNI ports. At this point, "credit-based" scheduling begins. Excessive next-neighbor jumps are prevented by setting a credit-less transport flag when egress port output queues are below a threshold (e.g., chassis egress is running far from full). The systems may include corresponding features of protocol needed for exchanging information on memory occupancy, queue occupancy, egress port occupancy, etc. (e.g., related to control plane mentioned above).

Edge ASICs with a programmable egress port pipeline may be configured to enable packet order recovery. A flat network interconnect may include direct edge port ASIC interconnection, which in some cases may be a full-mesh configuration. In other embodiments, it can have an Expander or other similar type of topology.

Edge ASIC ports are programmable to support either UNI protocol rich features or NNI low-resource distributed forwarding features with fast bypass. The use of programmable ASIC interfaces and flexible control protocols provides chassis switch topology that can be custom optimized for particular customer requirements. In some embodiments, a box having one set of hardware components can be deployed which works in Expander mode and in Clos mode to allow operation in either model. Basically, dual-mode ports can be used that offer fabric or client interconnection. A network operator may potentially mix Clos and Expander cabling within one system as needed to achieve customer goals, accurate timing distribution, etc.

Other novel features of the present disclosure include a chassis switch configured for use in a partially populated network (e.g., Expander, etc.), where a chassis card count may have a growth strategy that relies on the addition of pass-through cards (e.g., shorts) with a small number of pass-through connections to increase interconnect bandwidth in an under-filled chassis. The topology interconnect and internal state of various memories, queues, etc. may be auto-discovered according to the embodiments of the present disclosure by a distributed and/or centralized control plane, in which the computing system 60 may operate. To take advantage of the distributed fabric with many adjacent hops within a rack, a system may be configured by mixing PCB backplane traces, DAC cables, AEC cables, AOC cables, passive optical cables, and silicon photonics, depending on the length of a given link for the purpose of reducing bulk and cost.

Some of the benefits of the various embodiments discussed in the present disclosure may include providing substantial differentiation with higher cost systems and providing configurations that can operate with a lower cost, less power, and smaller footprint. The present systems also offer improved scalability, improved potential for a network growth trajectory, and ease in programming and changing the scale of the network. These systems may be used in various markets, including, for example, WAN routers/switches, intra-DC spine switches, Internet exchange cross-connects, and others.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A programmable switch arranged in a network having a plurality of switches and an internal fabric, the programmable switch comprising
   a plurality of programmable interfaces,
   a buffer memory component, and
   a processing component configured to establish each of the plurality of programmable interfaces to operate as one of a user-facing interface and a fabric-facing interface,
   wherein, based on one or more programmable interfaces being established as one or more fabric-facing interfaces, the buffer memory component is configured to store packets received from a user-facing interface of an interconnected switch of the plurality of switches via one or more hops into the internal fabric.

2. The programmable switch of claim 1, wherein the network is arranged with a flat internal fabric and full-mesh configuration.

3. The programmable switch of claim 2, wherein the flat internal fabric includes one or more of Direct Attach Cables (DACs), Active Electrical Cables (AECs), Active Optical Cables (AOCs), passive optical cables, silicon photonics, and Printed Circuit Board (PCB) traces.

4. The programmable switch of claim 1, wherein, based on one or more programmable interfaces being established as one or more user-facing interfaces, the processing component is configured to spread packets received at the one or more user-facing interfaces across interconnected switches in the network to improve balancing of an internal network load.

5. The programmable switch of claim 1, wherein the processing component is protocol agnostic.

6. The programmable switch of claim 1, wherein the processing component is configured to adjust an oversubscription ratio.

7. The programmable switch of claim 1, wherein the buffer memory component includes a Virtual Output Queue (VOQ).

8. The programmable switch of claim 1, wherein the buffer memory component is a High Bandwidth Memory (HBM) unit.

9. The programmable switch of claim 1, wherein the processing component includes one or more of an Application-Specific Integrated Circuit (ASIC) and a Field Programmable Gate Array (FPGA).

10. The programmable switch of claim 1, wherein the plurality of programmable interfaces are dual-mode ports, and wherein the processing component is configured to establish each of the programmable interfaces to operate in one of a user-port mode and a network-port mode.

11. The programmable switch of claim 10, wherein the processing component establishes the programmable interfaces to operate in one of the user-port mode and network-port mode based on a development stage of the network.

12. A system having a topology and an internal fabric, the system comprising:
    distributed memory, and
    a plurality of programmable switches interconnected with each other, wherein each of the programmable switches comprises:
        a plurality of programmable interfaces,
        a buffer memory component forming part of the distributed memory, and
        a processing component configured to establish each of the plurality of programmable interfaces to operate as one of a user-facing interface and a fabric-facing interface,
        wherein, based on one or more programmable interfaces being established as one or more fabric-facing interfaces, the buffer memory component of each respective programmable switch is configured to store packets received from a user-facing interface of another programmable switch via one or more hops into the internal fabric.

13. The system of claim 12, wherein, based on one or more programmable interfaces of a respective programmable switch being established as one or more user-facing interfaces, the processing component of the respective programmable switch is configured to spread packets received at the one or more user-facing interfaces across interconnected switches to improve balancing of an internal network load.

14. The system of claim 12, wherein the topology includes a flat internal fabric arranged in a full-mesh configuration.

15. The system of claim 12, wherein the processing components includes one or more of an Application-Specific Integrated Circuit (ASIC) and a Field Programmable Gate Array (FPGA).

16. The system of claim 12, further comprising a plurality of slots configured to receive one or more of the programmable switches.

17. The system of claim 16, further comprising one or more short cards configured to fill one or more of the plurality of slots, the short cards including an internal short path for enabling a parallel path between a pair of programmable switches.

18. A computer system operating in a data center having an internal fabric, the computer system comprising
    a processing device, and
    a memory device configured to store a switch programming module having instructions that, when executed, enable the processing device to
        control a plurality of switches of the data center by establishing each of a plurality of programmable interfaces of the switches to operate as one of a user-facing interface and a fabric-facing interface, and
        based on one or more programmable interfaces being established as one or more fabric-facing interfaces, cause a buffer memory component of a respective switch to store packets received from a user-facing interface of another switch in the data center via one or more hops into the internal fabric.

19. The computer system of claim 18, wherein the instructions further enable the processing device to adjust an oversubscription ratio.

20. The computer system of claim 18, wherein the plurality of programmable interfaces are dual-mode ports, and wherein the instructions further enable the processing device to establish each of the programmable interfaces to operate in one of a user-port mode and a network-port mode based on a development stage of the data center.

* * * * *